(12) United States Patent  
Swanson

(10) Patent No.: US 6,360,681 B2
(45) Date of Patent: Mar. 26, 2002

(54) METHOD FOR APPLYING LIQUID NONABERRANT NH3 IN DEEP BANDS FOR AGRICULTURAL CROPS USING A PROCESS OF DIRECT HIGH PRESSURE INJECTION

(75) Inventor: Guy J Swanson, Spokane, WA (US)

(73) Assignee: Exactrix Global Systems, Spokane, WA (US)

( * ) Notice: Subject to any disclaimer, the term of this patent is extended or adjusted under 35 U.S.C. 154(b) by 0 days.

(21) Appl. No.: 09/816,351

(22) Filed: Mar. 23, 2001

Related U.S. Application Data

(62) Division of application No. 09/173,442, filed on Oct. 14, 1998.

(51) Int. Cl.[7] ............................................... A01C 23/00
(52) U.S. Cl. ...................................... 111/119; 111/123
(58) Field of Search ........................ 111/118, 119, 120, 111/123, 900, 903, 200, 125, 126, 124; 172/1; 239/146, 147

(56) References Cited

U.S. PATENT DOCUMENTS

| | | | |
|---|---|---|---|
| 3,556,027 A | * 1/1971 | Ammann | 111/1 |
| 3,736,890 A | * 6/1973 | Barnes | 111/118 |
| 3,908,567 A | * 9/1975 | Brannan | 111/119 |
| 4,141,676 A | * 2/1979 | Jannen et al. | 417/539 |
| 4,175,394 A | * 11/1979 | Wiesboeck | 62/51 |
| 4,624,193 A | * 11/1986 | Johnston | 111/6 |
| 5,033,397 A | * 7/1991 | Colburn, Jr. | 111/118 |
| 5,260,875 A | * 11/1993 | Tofte et al. | 364/424.07 |
| 5,673,637 A | * 10/1997 | Colburn, Jr. et al. | 111/118 |
| 5,845,592 A | * 12/1998 | Ridgley | 111/119 |
| 5,967,066 A | * 10/1999 | Giles et al. | 111/119 |

* cited by examiner

Primary Examiner—Victor Batson
(74) Attorney, Agent, or Firm—Hovey, Williams, Timmons & Collins

(57) ABSTRACT

A method of applying liquid anhydrous ammonia to soil is disclosed as including the step of pressurizing anhydrous ammonia received from a source. The pressurized anhydrous ammonia is conducted to a plurality of terminal outlets, wherein each of the outlets is configured to maintain a back pressure and thereby the liquid state of the anhydrous ammonia. The anhydrous ammonia is discharged from the plurality of terminal outlets to thereby contact the soil.

32 Claims, 4 Drawing Sheets

METHOD FOR APPLYING LIQUID NONABERRANT NH3 IN DEEP BANDS FOR AGRICULTURAL CROPS USING A PROCESS OF DIRECT HIGH PRESSURE INJECTION

RELATED APPLICATION

This is a divisional application of application Ser. No. 09/173,442 filed Oct. 14, 1998, which is incorporated by reference herein.

BACKGROUND OF INVENTION

This invention relates to the accurate application of NH3 on agricultural fields.

DESCRIPTION OF PRIOR ART

NH3 or anhydrous ammonia is a low cost and a physically difficult material to comprehend. It is out of sight and out of mind and seldom understood. The pressure increasing direct injection system requires reverse thinking for the designer and user. The new method and application system applies NH3 without freezing the fines. This is opposite the old pressure reducing system since the unfrozen or melted lines mean no NH3 is being applied. In fact a frozen line on the new pressure increasing system is the visual indication of a partially plugged line.

Anhydrous ammonia expands almost 100 times its stored volume as a gas. When it boils at −28 degrees F approximately 85% remains liquid and the balance is given off as a gas. Yet it looks like water when observed in its liquid state. NH3 has a flow resistance of 0.85 X's water. NH3 superheats when combined with water to form aqueous ammonia at 24% nitrogen. A tremendous amount of heat is given off when NH3 converts to NH4 and thus vapor is often observed on high humidity days. This vapor is quite insignificant and is said to be less than 0.01% (100 PPM) of the material applied with the NH3 applicator. NH3 is lighter than air and has a specific gravity of 0.590 as a gas and a specific gravity of 0.662 as a liquid.

The NH3 molecule becomes NH4 by attracting the hydrogen atom from the H20 molecule producing beat and releasing hydrogen and oxygen back into the atmosphere. By weight NH3 is 82.5% nitrogen as applied into the soil. This is the highest analysis of any commercial fertilizer. The material is the source for other types of fertilizer whether liquid or dry. It is the most economical material to transport from the natural gas production fields of the world.

NH3 is also used as a refrigerant as it is highly compressible and low cost. Most of the ice found at grocery stores comes from centrally located ice companies that use compressors and NH3 as the refrigerant.

Small doses of the material are medicinally used to revive the unconscious person. However, the material is lethal and can maim anyone who comes in contact with the material. Safety concerns are well documented and goggles, protective clothing, gloves and water are mandatory when working with the material.

Anhydrous ammonia or NH3 has been widespread use in agricultural crop production since the early 1950's. NH3 was initially priced quite low and by the 1960's was adapted so broadly that it became a major component in the cost of production for all major cereal crops. The price of the material dropped to 2 to 3 cents per lb. of Nitrogen in 1963 and 64 as several new plants went on line utilizing train compressors. This new technology was so efficient that the cost of producing NH3 was reduced to all time lows. The NH3 production plants, which typically produced 250 tons per day, were now capable of up to 1,500 tons per day. Thus a significant oversupply occurred. Today the industry contributes up $2 billion annually to the economy. No new plants are under construction due to high initial cost of erection and startup. Most NH3 plants are simply upgraded to improve efficiency. Almost all NH3 plants operating today use train compressors developed by Kellogg Corporation.

NH3 is priced at about ½ the cost of the liquid and dry sources of nitrogen. Commercial fertilizer manufacturers utilize NH3 as a base material to build urea, ammonium nitrate, ammoniated phosphate, and ammonium sulfate. Utilizing NH3 as the primary source of nitrogen results in the lowest cost of production historically.

Approximately 85% of the NH3 is consumed in the Midwestern cornbelt at 4,000,000 tons annually. The Pacific states consume about 220,000 tons annually.

Terms

Nonaberrant: No boiling or expansion of the material from the liquid pressurized state to the gaseous pressurized state. This wandering or errant flow is difficult to meter and the NH3 gas will flow in an irregular path. Previous pressure reducing systems have aberrant flow.

Transitional flow: At a given pressure and temperature NH3 will begin to convert from a liquid state to a gas state. This will occur when distribution or injection line pressure begins to drop below tank pressure. The pressure increasing system of direct injection denies transitional flow. Pressure reducing systems common to the fertilizer systems of today allow transitional flow to occur immediately after the metering pump, the pressure reducing valve, or the meter.

Tank pressure: The pressure observed at the NH3 pressure vessel or the tank varies with the ambient temperature.

| Predictable Tank Pressures At Ambient (Vapor Transfer) | |
|---|---|
| −28F | 0.0 psi Tank Pressure |
| 0 | 15.7 psi |
| 32 | 47.6 psi |
| 42 | 50.0 psi |
| 50 | 75.0 psi |
| 60 | 92.9 psi |
| 68 | 110.0 psi |
| 77 | 130.0 psi |
| 100 | 197.2 psi |

Manifold Pressure: The pressure observed in the distribution cavity of the manifold. Pressure reducing systems always have manifold pressures below the tank pressure. The new direct injection pressure increasing system meters NH3 very accurately at the manifold since the manifold pressure is below the tank pressure, at the tank pressure or above the tank pressure at normal seeding speed.

Line Pressure: Varies significantly with pressure reducing systems and line pressure is lower than manifold pressure due to expansion of NH3 in the oversized lines. This is primarily due to the extra volume found in the lines. Thus external freezing of the lines is observed since line pressure is below tank pressure. The lines accumulate dew. The lines are operating well below freezing to −28 degrees F. The unique pressure increasing system has line pressures at or above tank pressure and the lines do not freeze or collect frozen dew.

Terminal Expansion Point: Ideally is located at the point of injection of the material into the ground. A final orifice located at this point allows for precise metering and uneven line lengths. Pressures are elevated above tank pressure at this injection point allowing for a solid non-gaseous stream flow and less vaporization. Pressure reducing systems require equal line lengths. The final injection point with pressure reducing systems is about 15% NH3 gas and 85% is a nonuniform NH3 liquid since injection pressure is well below vapor or tank pressure.

In Line Orifice or Range Orifice: The range orifice is located after the manifold and is inserted into the injection line at the high-pressure adapter. This orifice is selected by picking the maximum rate in the band at the maximum ground speed. For maximum accuracy line lengths must be equal if no terminal expansion orifice is used. This system set up is easier to use for changing orifices but it does have some aberrant flow if the terminal expansion orifice is not used. However, temperature drop is seldom significant enough to observe line freezing or dew accumulation.

Terminal Injection Orifice: The orifice is located at the end of the small inside diameter black nylon line by inserting it into the line and clamping it with a stainless steel compression clamp. The terminal injection orifice is designed to allow for a solid stream flow. Unequal line lengths can be used. Port to port variance can be a little as 1% if precision calibrated orifices are used. The range orifice is not required, but should be utilized to support the high pressure clamping aspect of the ferrule. Terminal expansion orifices can be utilized as range orifices. The terminal expansion orifices can also be sized one size larger than the range orifices which allows stream particulate escapes to plug the smaller range orifice which is more serviceable at the manifold. The range orifices and terminal expansion orifices are identical by design. Only the location of the part is different.

The orifices are selected by (1) Band spacing, (2) Ground speed, (3) above tank pressure desired at application speed, (4) Gallons per acre to be applied. Generally speaking once the correct orifice size has been selected it will not be necessary to change orifices due to the wide range of operating pressures.

Distribution Manifold: A captious component in the regulation of NH3 is the manifold. The pressure increasing direct injection manifold is designed with a minimum volume for a quick site specific, variable rate, GPS response and to prevent aberrant flow. The manifold is mounted at or near the pump so that the material is instantly placed in the soil. The system stores very little material and this feature is critical to prevent gassing at corners and start and stop response with the applicator.

Accumulator: The accumulator is critical to prevent aberrant flow since the pump is delivering liquid NH3 in metered surges. This means that the pressure increases and decreases during each revolution and the pump piston never travels at the same speed. A nitrogen spring or accumulator acts as a flywheel, storing energy and the giving it back to the system. This means that the accumulator piston moves up and down with each pump revolution. As pressure increases the accumulator piston moves up. As system pressure drops the accumulator piston moves down. The accumulator piston does not move when the system pressure is below the preset nitrogen charge in the accumulator gas charge chamber.

Accumulator Pressure Settings: The accumulator is charged with nitrogen gas. The accumulator is charged to ½ the maximum system operating pressure. The accumulator can also be charged at the tank pressure or ½ to ⅔ of the tank pressure. If rates are being adjusted constantly with a variable rate, site specific, GPS system charge the accumulator at ½ tank pressure. The manifold NH3 pressure gauge should be steady (5 psi movement) at normal application speed. Pressure reducing NH3 systems do not use an accumulator.

Safety Shield: The shield slides up and down on the accumulator tie bolts. The shield contains and protects liquid NH3 from being haphazardly sprayed on the machine or operators if the line adapter assemblies are improperly installed when orifices are inspected or changed. Pressure reducing systems do not use a safety shield.

Maximum Design Pressures:

| | |
|---|---|
| Black nylon line N11, .138 d | 500 psi operating, 2,000 psi burst |
| 316 L stainless steel fittings | 2,000 psi operating |
| Terminal expansion orifice | 800 psi operating |
| Accumulator maximum charge | 200 psi operating, 2,000 psi burst |
| Pump system relief valve | 300 psi operating |

Pressure reducing systems use translucent EVA (Ethyl Vinyl Acetate) lines at the manifold distribution point that are rated at 75 psi. Pressure reducing systems must meet the pressure standards set by various states prior to the pressure reducing valve. The supply lines must have a 300-psi operating pressure rating as specified by the State of Indiana.

System Filters: The new pressure increasing system has two filters. The system primary filter is located prior to the pump. The screen is normally 100 mesh. A second 100 mesh final safety filter is installed after the pump and prior to the manifold to catch any failed parts or rust that may have collected in the pump during storage or pump service.

System Relief Valve: When operating at high ambient temperatures, above 80 degrees F, or with a remote mounted manifold utilizing an on/off Gromo™ valve. It is recommended that two 300-psi relief valves be installed to protect the pump.

The Pump: The Dempster® E-5 and E-6 positive displacement pumps have been developed. The pumps are positive displacement and are uniquely different from previous pressure reducing pumps. Several recent improvements have been incorporated into the pump to allow for a 300 psi direct injection system pressure. Dempster has built pressure reducing pumps for NH3 since 1958 and their pressure reducing B-3 and B-4 pumps are well known in the fertilizer industry. John Blue/Thurston also offers a pressure reducing pump. No beat exchanger or super cooler is used in the direct injection pressure increasing system. E-6:0.1236 gallons per stroke, 350 rpm, Range @ 8 mph, 40 to 195 lbs. N @ 52.5 ft. E-6:0.0515 gallons per stroke, 350 mm, Range @ 8 mph, 40 to 195 lbs. N @ 32.5 ft.

Global Positioning, Variable Rate Technology: The pump can be driven hydraulically or electrically, fully stroked and in combination with the accumulator setting can apply rates per acre of NH3 from virtually nil to the maximum rate with within a ¼ second. Pressure reducing systems require 14 seconds to respond to a full rate signal change. Site specific farming can be achieved within 3 feet of travel verse 200 feet of travel with the pressure reducing systems. This is a unique feature of the pressure increasing system.

Prior Art of NH3 Application

Two basic systems are used to apply NH3 to agricultural soils. Both systems require a shank type tool to apply the material below the ground line. The method has always been to reduce pressure from the supply tank. The material becomes gaseous dropping below vapor pressure as it leaves the supply tank. NH3 will expand almost 100 times its stored volume as it is applied to the soil. Both of these systems in widespread use are referred to as pressure reducing systems. NH3 has always been metered and applied previously to agricultural soils at a pressure below vapor pressure or tank pressure.

The inventor made an accidental discovery in the first field trials with an electronic pressure reducing system. At the time of the trial the wiring to the pressure-reducing valve had been reverse wired after the pressure reducing valve had been changed. The result was the injection lines began to melt the frozen ice that bad clung to the lines from the previous pass. The gallons per acre were applied at such a rate that maximum system flow occurred resulting in above freezing temperature ammonia being applied. The applied per acre rate was in excess of 200 gallons per acre. Having never forgotten this observation the inventor began investigating in later years a means to meter and place liquid ammonia with no line freezing. Several approaches were tried. Compressors were even considered to capture the vapor and place it back into the tank. All approaches appeared unfeasible either due to complexity, maintenance or cost. Given more time and an opportunity to investigate in a more leisurely manner produced a new discovery of increasing pressure above vapor pressure and keeping NH3 temperature at close to ambient. Three unplanned discoveries resulted; improved accuracy, improved rate change response and no line freezing.

The first pressure reducing system uses a throttle or meter to reduce pressure. These can be mechanical or electromechanical units that utilize a pressure reducing manifold. Dempster Industries Inc. of Beatrice, Nebr., developed the second pressure reducing system. This system uses a pump to reduce pressure below tank pressure and therefore deliver metered amounts through a discharge valve. As the material eaves the discharge valve pressure is reduced and the distribution manifold receives a mix of liquid and vapor.

The first known placement of NH3 occurred in 1930 at the Delta Branch, Mississippi Agricultural Experiment Station, by J. O. Smith. A small cylinder of compressed anhydrous ammonia was adapted to a one-row cultivator and was drawn by white mule. This was the first pressure reducing system as reported in The History of the U. S. Fertilizer Industry. Lewis B. Nelson, Tennessee Valley Authority, 1990.

Shell Chemical Co. of Pittsburgh Calif. bad progressed to a point in 1934 whereby NH3 could be a commercial operation handled by distributors. They introduced the NH3 primarily into irrigation water. In order to reduce production costs by producing in higher volumes Shell engineers looked at other uses for crops by injecting NH3 into the soil. Commercial application began in 1942 and spread to the three Pacific States.

Meanwhile in 1944 W. B. Andrews at the Mississippi Experiment Station began developing the principles of NH3 injection. The published results and principles were released in 1947. The developed equipment consisted of a tractor; a supply tank or pressure vessel; a flow meter which measured the flow out of the NH3 tank; a knife like applicator shank with an iron pipe and a rubber tube for injecting the NH3 5 to 6 inches into the soil; and covering equipment such as disc hillers to prevent gaseous loss from the application channel. The project was support by the TVA in part from 1944 to 1948. By 1947 the market was ready and several pressure reducing flowmeters went into service. Steel was now available to build the pressure vessels, as swords now became plowshares with the end of the WWII.

By 1955 NH3 accounted for 25% of all the applied nitrogen types. By 1965 NH3 accounted for 40% of the nitrogen market. By 1980 60% of the applied nitrogen in the Midwest was NH3. NH3 has evolved into an annual two billion-dollar industry.

The most popular application system today is the low cost regulator method that uses a pressure-reducing valve called a meter to throttle the flow after the tank and prior to the manifold. For example U.S. Pat. No. 5,170,820, Dec. 15, 1992, Management System For The Application Of Anhydrous Ammonia, James S. Jones describes a new apparatus for applying NH3. This apparatus utilizes the vapor pressure of the system to propel the NH3. The rate per acre is regulated by a throttling device. This system uses a pressure reducing multiport manifold. This allows vapor and liquid to pass to individual ports. The manifold pressure at application speed is below tank pressure. This system requires applicator injection lines of a equal length to each row or band of NH3. This helps to even out the pressure differences between each row. The resistance to flow is the same for each line due to equal line length. Unfortunately well over 1,600 feet of line is used for a 48 foot applicator.

Another disadvantage of the pressure reducing system is that vapor and liquid is mixed in the flow. This problem is discussed in U.S. Pat. No. 4,432,651: Feb. 21, 1984, Apparatus For Mixing Vapor And Liquid Phases Of Anhydrous Ammonia, David M. McLeod. The pressure reducing manifold is distributing the NH3 to the individual applicator lines as 90% vapor and 10% liquid by volume. The drop In pressure can be between 5 and 30 psig resulting in a temperature drop. The flow is aberrant creating irregular flow patbs in the manifold ports.

As the flow enters the applicator injection lines it surges. Line pulsing or vibration is often observed. Pressure reducing systems have port to port rate variance, as measured on 12 inch bands, up to four times greater from one port to another.

Wider 30-inch band spacings have measured variances between 30 and 34%. Specially modified Vertical Dam manifolds can achieve variances port to port of 15% on 30 inch band spacing. Considerable research has been carried out at the University of Nebraska and Iowa State which is reported in the September 1997 again in November 1997, and the September 1998 issue of Successful Farming. Rich Fee, Crops and Soils Editor reports results from tests that verify the tremendous variance port to port of pressure reducing systems.

The specially modified pressure reducing Vertical Dam manifolds do not regulate as effectively at very low ground speeds. Up to six individual pressure reducing manifolds are installed on one machine to meter more effectively. The observed and measured regulation varies from low speed to normal seeding speed (5 to 7 mph). This is a problem for No-till drills and Airseeders since they must travel at very slow speeds (2 to 3 mph) when residue levels are high. The residue must be given more time to weave through the shanks that are applying seed and the NH3. Residue plug ups can occur which require the operator to stop the machine. The operator may also elect to loop around and deposit the plugged residue outside the seeding area. The machine maybe backed up and restarted several times. The start and stop requires a large volume recharge of the 1,600 feet of applicator line. NH3 is highly compressible and the pressure reducing method will often take 14 to 15 seconds to restabilize.

The applicator injection lines leaving the pressure reducing manifold ports to the soil knives or shanks are normally ½ inch inside diameter lines. These ethyl vinyl acetate lines are large to allow for the continued reduction of pressure from the manifold. The eva lines have a maximum 75-psi rating indicating a low pressure reducing system. The stored volume of 1,600 feet of line is 16.2 gallons. This is 3,763 cubic inches. This is the equivalent to the displacement of twelve V-8 engines. The NH3 expands almost 100 times from the liquid phase to the vapor phase. Each change in either ground speed: start, or stop results in a time delay to establish a new equilibrium of pressure and concentration of liquid and vapor.

NH3 is also used as a commercial refrigerant. It is highly compressible. Pressure reducing NH3 application systems use vapor pressure of the supply tank to force the material through the supply lines, coolers, flowmeters, regulating valves, manifold and the applicator lines. Each component reduction in pressure results in boiling, a temperature drop, and errant flow. Only the tank pressure can be used to recompress the vapor phase in the lines.

Compression of NH3 takes valuable time when only tank pressure is available. With variable rate, site specific, GPS application systems the response is immediate (¼ to 1 second) using liquid and dry fertilizer systems. The pressure reducing aberrant flow NH3 systems require about 14 seconds to reach a stabilized new rate. At normal seeding speed this can be over 200 feet of travel (¼ acre @ a 50 foot width). This is not desirable and results in NH3 being noncompetitive with other fertilizer choices for site specific, variable rate application of this critical input.

Creeper speeds (1 to 2 mph) are often utilized to calibrate the Airseeders and No-till drills. It is observed that the machine will creep up to 10% of the time. The vapor phase is significantly higher at low speeds. The liquid phase is discharged in small surging volumes as the NH3 boils. Pressure reducing systems have an optimum ground speed for best regulation.

Designs to improve mixing of liquid and vapor phase NH3 with additive materials have been implemented. See U.S. Pat. No. 4,448,540 May 15, 1984, Apparatus For Mixing A Liquid Additive Compound with Vapor And Liquid Phases Of Anhydrous Ammonia, David M. McLeod. Thus it has been proven that pressure reducing systems offer serious problems for mixing of additives. The reduction in pressure causing aberrant flow results in irregular paths of flow.

Manifolds with up to 72 ports for very wide Airseeders on narrow 7.5 to 12 inch band spacing have very low concentration of NH3 in each port. Port to port regulation on steep slopes and rolling land is poor since the liquid phase is very sensitive to the slope angle of the manifold. The vapor phase is highly compressible. The uphill side of the applicator receives less material than the downhill side of the applicator. To overcome some this problem the manifold supply ports are sequenced in alternating hookups. The lines are sized to equal lengths. The uphill side of the manifold then directs half of the flow to the uphill side of the applicator outlets and half of the flow to the downhill applicator ports. The downhill side of the manifold is plumbed in the same manner of alternating hookups to the uphill and downhill side of the applicator. The uphill side and downhill side of the applicator still deliver the selected per acre rate. However every other band will have as much as a four times variance port to port across the full width of the machine. This has been a temporary solution to a permanent problem. The liquid phase and vapor phase together in the same cavity produce irregular flow paths that are subject to slope angle, inertia, ground speed, band concentration and ambient temperature.

Transitional flow begins as the liquid material leaves the tank. Each valve, filter, fitting and supply line length produces compounding resistance. NH3 is applied at ambient freezing temperatures and pressure drops do occur prior to the regulating pressure reducing meter. Tank pressure is considered low when the temperature is below 50 degrees F. The cold temperature results in a higher percentage of pressure drops. If the supply side of the system is properly designed from the tank to the meter this pressure drop can still be significant at freezing ambient temperatures. Coolers are used in pressure reducing systems to alleviate some of this problem. Thus true transitional flow begins at the pressure reducing valve. Wider applicators traveling at higher speeds need better system designs to handle higher flows. The temperature of the NH3 is flow critical to the resistance of the system.

The pressure reducing valves are discussed in U.S. Pat. No. 4,364,409, Dec. 21, 1982 Fluid Flow Control Device, James S. Jones and in U.S. Pat. No. 4,657,568 Apr. 14, 1987, Apparatus for Volumetrically Controlling the flow of a Gas and a Liquid Mixture, James S. Jones. Both of these inventions are dependent on pressure reduction to facilitate metering and to organize a flow of gas and vapor. Both inventions produce a temperature drop and aberrant flow through a manifold and lines.

Pressure reducing systems use coolers to stabilize the flow of NH3 to the meter. The coolers are simple heat exchangers that bleed off about 2% of the material through the heat exchanger. The bleed off material is directed into the ground via an extra line. The extra line can be directed to a soil knife or through the manifold to all the knives.

Continental an active patent holder in the field of NH3 refers to the cooler as an equalizer. Continental states the equalizer is "A simple compact device which employs refrigeration of ½–2½% of the liquid in the system to super cool the remaining 97½–99% of the liquid. Accurate metering of super cooled liquid ammonia becomes as easy as metering water since both behave as true liquids."

The coolers add expense to the system and can plug when additives are premixed with the NH3. The cooler is required for electronic pressure reducing systems and mechanical pressure reducing systems too assure a nonaberrant flow to the measuring flow meter and the regulating valve. Following the regulating valve and prior to the manifold the NH3 becomes aberrant.

Ravens® Industries states in their ACCU-FLOW ATTACHMENT sales document form FCD5M497. "Cooler can be disassembled for cleaning and preventive maintenance." My invention requires no coolers and thus is simpler. Although coolers can be used with the direct injection system they offer no major economic advantage. The goal is to deliver ambient or warm pressurized liquid NH3 throughout the metering system.

All electronic NH3 metering systems use rate controlled pressure reducing valves in combination with electronic encoded flowmeters. Raven® Industries in their sales pamphlet SCS 440, SPRAYER CONTROL SYSTEMS, show a GPS compatible controller that applies NH3 accurately on a per acre basis using a pressure reducing system. Their pressure reducing Accu-Flow attachment is adaptable to their SCS440 Automatic Sprayer Control system. No reference is made to port to port accuracy of NH3 or instant response to the variable rate signal. Spraying Systems Co.® in their catalog 802 SPRAY CONTROL SOLUTIONS, page 25 show their pressure reducing NH3 system. DICKEY-john™ in their publication PCS™ Precision Control System catalog number 11071-0231 shows a pressure reducing system utilizing a cooler to reduce pressure. Injection line freezing is illustrated in their front cover color picture. MICRO-TRAK® SYSTEMS, Inc. in their publication NH3 KIT shows a pressure reducing heat exchanger. No NH3 application systems whether mechanical or electromechanical raise pressure above tank pressure.

Another disadvantage of the pressure reducing system is line freezing. The temperature of the applied NH3 drops well below 32 degrees F. Frost begins to accumulate on the lines. The exterior of the injection lines becomes heavily laden with frost gathered from the humid atmosphere. The shank also begins to freeze and ride out of the soil. This is a serious problem for No-till drills and Airseeders that simultaneously deep band NH13 and apply seed with the same opener.

A non-frozen application line indicates a plugged line with a pressure reducing system. A partially plugged line remains frozen on a pressure reducing system. The new pressure increasing direct injection system has the unique feature; the lines do not freeze in normal operation. A partially plugged line will freeze with a pressure increasing system. The NH3 is injected into the soil at temperatures well above 32 degrees F.

Several inventors have developed openers that allow for line freezing and loss of ammonia vapor. U.S. Pat. No. 4,116,139, Sep. 26, 1978, Cold Flow Liquid Vapor Shoe, Clement J Sauer, discusses the problems of dispensing liquid and vapor NH3 into the soil. Sauer states "It is the general object of the present invention to provide field plowing and field fertilizing apparatus which will dispense both ammonia liquid and ammonia vapor in a plowed field trench, and which will accomplish this dispensing action in a way which will encourage retention to the ammonia in the field soil." Retention of NH3 can be improved if the material is discharged as a liquid. The vapor is difficult to control and seal in the soil.

The use of pressure reducing NH3 systems with airseeders has prompted many large fertilizer companies to publish information about the peculiar aspects of the NH3 material. Westco Fertilizers, Calgary, Alberta. John Harapiak, Thom Weir in their publication, Westco Guidelines, Applying NH3 at Seeding, confirm "The conversion of liquid NH3 to a gas results in considerable chilling of any metal parts it contacts. The line carrying the NH3 must be isolated or insulated from the opener to prevent the opener from building with frozen soil. This problem is aggravated by cold soil, high N application rates and wet soil. Accumulation of frozen soil on the opener increases the width of the furrow being created and reduces the ability of the soil to flow around the opener to seal the NH3 into the soil. The NH3 that escapes from the band could cause damage to the germinating seeds or could be lost to the atmosphere."

Harapiak and Weir make further note about the uniform distribution of NH3. "Uniform distribution of NH3 to all the openers is critical to avoid the risk of germination damage associated with excessive rates of NH3. Select a non-gravity based distribution system for best results."

The problem of placing seed and NH3 at time seeding is also complicated by the use of dry fertilizer materials such ammoniated phosphate and potassium chloride dry prills. The NH3 as it is chilled collects dew and frost and requires very special opener designs. These designs disturb and fracture the soil and require extra horsepower. Poor seedbeds result from such deep placement. Thus the chance of No-till seed and fertilizer system is dramatically reduced. It is often not possible to place NH3 and dry fertilizer with these improved openers without constant attention by the operator.

In very wet cold conditions the NH13 observed vapor is actually water vapor from the air combining with a very small amount of NH3 (less than 200 PPM). The water vapor collects on the steel openers and blocking the flow of dry materials. A special opener design is observed in U.S. Pat. No. 3,854,429, Dec. 17, 1974, Fertilizer Dispenser Calvin B. Blair.

Fracturing and cracking of the seed bed is further discussed in U.S. Pat. No. 5,140,917, Aug. 19, 1992. Method and Apparatus for Fertilizing Agricultural Crops, Guy J. Swanson and U.S. Pat. No. 5,752,453, May 19, 1998 Apparatus for Use in Applying Fertilizer, Lee F. Nikkel. Present opener designs for placing NH3 must have wide shanks to accommodate the large NH13 injection tube. These shanks fracture the seedbed up to 6 inches in width. The large NH3 lines make opener design and accurate targeting of the NH3 difficult.

Deep banding NH3 with dry or liquid ammonium phosphate has special chemical and physical issues. The freezing action of the pressure reducing NH3 injection line will often freeze liquid orthophosphate lines and stop the injection of the material. The chemical availability for the plant to take up the placed phosphate is also dramatically affected in spring wheat production if the band becomes too concentrated with NH3. As reported in Bumper Times, January/February, 1991 Volume 16, Guy J. Swanson, author, page 6 states, Producers should switch to nitrate nitrogen if band concentration exceeds 55 lbs of N on 20-inch band spacing. "Hot bands" and even localized in the band hot spots can occur with pressure reducing systems since the flow into the band is in surges and never consistent. The pressure reducing manifolds also have band concentration variance as great as tour times. Some band may have 50 lbs of placed nitrogen and other bands will have 200 lbs of placed nitrogen in the form of NH3. The per acre rate maybe 100 lbs of placed nitrogen on the average but half of the crop is starving for nitrogen and the other half is starving for phosphate because of the "Hot bands" or nitrogen interference by the NH3.

A typical gravity based system is shown in U.S. Pat. No. 4,196,677, Apr. 8, 1980, Anhydrous Converter and Implement for Applying Ammonia to the Ground, Louis P. Siebert. A gravity based system is also discussed in U.S. Pat. No. 4,060,029, Jan. 17, 1978, Process and Apparatus for Producing and Using Cold Ammonia, John Wilham Hudson. It is also discussed in U.S. Pat. No. 3,978,681, Sep. 7, 1976, Method and Apparatus for the Adiabatic Expansion of Liquid Anhydrous Ammonia, William L. Kjelgaard and Paul M. Anderson. All the above patents discuss reducing pressure either before or after the distribution manifold. Cold liquid (@-28 degrees F) ammonia and cold liquid vapor is delivered to the openers. The ammonia delivered is about 85% liquid and 15% vapor. The ground-engaging opener readily freezes and collects frozen mud. The opener depth is hard to control. The machine pulls harder because of the frozen shanks.

U.S. Pat. No. 4,196,677, Apr. 8, 1980, Anhydrous Converter and Implement for Applying Ammonia to the Ground, Louie P. Siebert is a pressure reducing system invention. Siebert states in his summary that, "Ordinarily, it is not desirable to pressurize the ammonia as it is being applied to the soil and thus the vents are provided for relieving this vapor pressure". This invention cannot deliver accurate rates port to port or allow for a quick response required for variable rate GPS systems in use today.

The specific gravity of liquid NH3 is 0.662. The specific gravity of NH3 gas is 0.690. If NH3 is applied just below vapor pressure gravity and resistance will affect flow pattern and rate. For NH3 to be applied accurately port to port it is required that the NH3 material be applied as a gas only or as a liquid only. No previous system has utilized either approach.

Thus pressure reduction chills the anhydrous ammonia, producing irregular flow patterns and which makes the mix liquid and vapor NH3 slope and inertia sensitive. The above systems have been used by the inventor and found to be unsatisfactory in meeting the variable rate, site specific, GPS requirements. Port to port regulation cannot be controlled in a dynamic field wide application of NH3. Severe freezing of manifolds openers, and lines occurs.

Furthermore the respected inventors in U.S. Pat. No. 4,900,339, Feb. 13, 1990, Ammonia Flow Divider. David P. Ward and James S. Jones discuss the challenge of separating liquid from gas in NH3 placement. Their device improves the depth of placement of NH3 by placing the chilled vapor separately from the chilled liquid ammonia. The result is shallow placement for sidedressing of growing row crops and placing the vapor away from the plant to avoid leaf burn. This system complicates the design of the machine. The cold temperature of the NH3 freezes openers. The NH3 is not in a pressurized state above vapor pressure to assure accurate timed placement for GPS, variable rate, site specific application.

Pressure reducing systems have errant, boiling flow of liquid and vapor NH3. The port to port variations can be as great as four times. A major problem results with wide airseeders since the time period to change flow rate is related to gravity flow or pressure reduction. The rate change is not instantaneous since highly compressible vapor and liquid NH3 is in a mixed state not in a pressurized liquid state.

Accuracy of NH3 placement was recently implemented by Continental NH3 Products Inc. of Dallas, Tex. Airseeders and No-till drills have up to 72 ports to place NH3 in small grain production. Sand centers are common at 7.5 inch, 10 inch, and 12 inch. The machines can be up to 60 feet in width as noted in the Case/Concord sales bulletin AE-170086. Continental has developed a Vertical Dam manifold to improve the port to port variances commonly found on these machines. U.S. Pat. No. 4,807,663, Feb. 28, 1989, Manifold for the Application of Agricultural Ammonia, James S. Jones discusses an advanced manifold which is commercially referred to as the Vertical Dam manifold.

The Vertical Dam manifold is a pressure-reducing manifold as discussed in the patent summary. "A manifold for receiving metered anhydrous ammonia that is a variable combination of liquid and vapor routes the ammonia to the outlets of an applicator for proper injection into the soil by continually accelerating the ammonia as it approaches a discharge member having a plurality of discharge ports evenly spaced and retained between a body member and a bonnet member to form a restriction of equal value for each discharge point." Even though the manifold is better than previous manifold designs as pointed out in the Iowa State study that appears in the September, 97 and September, 98 issue of Successful Farming as reported by Rich Fee, it is complicated system.

All of the previous discussed problems are still apparent. They are: Up to six manifolds are required for a 60 foot Case/Concord Airseeder. An additional flow divider is required. An additional 120 feet of 1 inch reinforced eva 150-psi hose is required further increasing the distribution line displacement to 4,520 cubic inches (20 gallons). The manifold freezes. The lines freeze supplying the manifold. The lines freeze that supply the openers. Port to port accuracy is at best 15%. Tremendous time is required to respond to the variable rate GPS signal change. All lines from the manifold to the knives must be of equal lengths. Continental NH3 Products in their Installation Instructions for the Vertical Dam manifold state, "The higher the manifold pressures (up to 65% of tank pressure) the better. Manifold efficiency peaks at 65% of tank pressure. Surpassing 65% will not produce any better results."

Of further concern is safety since more components mean more chance of failure. Troubleshooting and maintenance is further complicated since all the eva lines must be replaced every five years by law (See State of Indiana Regulations).

Changing band spacings on the applicator is difficult on the Vertical Dam manifold since each manifold and group of manifolds is specifically built for the applicator. The manifold ports cannot be simply blocked off and accuracy maintained. The flow of liquid and vapor NH3 must be sequence through each balanced port.

The second pressure reducing system uses a pressure decreasing pump with a discharge valve originally patented by Dempster Industries Inc.® U.S. Pat. No. 2,968,255, Jan. 17, 1961, Pumps, Herman M. Loeber. Clearly the inventor designed the pump to decrease pressure from the tank supply pressure. The reduced pressure material was metered at ground speed and thus was insensitive to variable ground speed, which often results in hillside farming. The pump was widely applied in the western U.S. and became a standard for farmers that needed to constantly change ground speed. Some of initial testing and evaluation was carried out with unmodified Dempster pumps, however the pumps were not able to elevate pressure above tank due to design of the pump. Many of the pump components could not meter the material without failure in the pressure increasing system. Additional components were added and altered components were installed. The pump predelivery testing procedure was developed around higher pressures with NH3.

Dempster Industries publishes several owners manual for their pressure decreasing pumps. In the owner's manual for the model B-4 pump Form 3018 the author discusses troubleshooting, High Operating Pressure, and the possible cause being restricted delivery lines. Obviously this would indicate that elevated pressures is considered a defective system.

Another pressure decreasing pump that has been modified to meter NH3 in a pressure decreasing system is the Thurston/John Blue BLU-JET pump. As stated in their sales bulletin BLU-JET®GD1 200™ it is obvious the pressure decreasing pump reduces pressure since they use a cooler. No high-pressure lines are represented at the manifold. Although the John Blue pump could be modified similar to the Dempster pump to elevate pressure it would not be consistent to share valuable development information with two pump manufactures. A confidential relationship exists with Dempster and much of Dempsters development work may be patentable.

In the initial development stage several state and federal plant nutrient and soil scientists along with agricultural engineers were contacted about their experience and knowledge in raising pressure of the NH3 above the tank pressure. All scientists reported back it had never been done and could not be done. Further reference was made by one scientist referring to the Spraying Systems Co. catalog 45 A, Agricultural Spray Products Catalog "stating that if raising NH3 pressure above tank pressure was doable Spraying Systems would have offered it. No reference is made in their catalog nor are orifice charts available for application of NH3. On page 3 of their catalog they discuss specific gravity and conversion factors for liquids weighing from 7 lbs. per gallon to 14 lbs per gallon. NH3 weighs 6.2 lbs. per gallon. No presentation is ever made that NH3 can be applied on agricultural fields using their flow regulators for liquid fertilizers or soil fumigants, page 40 and 41 or using their solid stream spray nozzles page 43 for banding liquid fertilizers.

Spraying Systems Co. orifice charts indicate application pressures to 60 psi. Pressure increasing systems require orifice charts to 300 psi. Special in line range and terminal orifices were developed for the pressure increasing system. The new unique orifice designs were required to handle high pressures and also very low volumes of liquid NH3. The high concentration of nitrogen in very narrow bands dictated new manufacturing techniques not commonly found in the agricultural machinery business. The technical manual 998A for the pressure increasing direct injection system from EXACTRIX GLOBAL SYSTEMS L.L.C. which markets the new method and apparatus shows special orifice charts and troubleshooting techniques required for the superior system.

Pressure increasing direct injection NH3 systems have not been used previously in the application of NH3 to agricultural crops. A review of various suppliers from the 1998 Parts & Sales Catalog for Horvick Manufacturing of Fargo, N.D., pages 161 to 200 indicates several pressure decreasing systems are available. Squibb-Taylor in their catalog AA-98, Anhydrous Ammonia (NH3) Equipment shows only mechanical or electromechanical pressure reducing systems available. John Blue in their Catalog 100 CAT 9/94 page 43–47 show only pressure reducing manifolds and flow meters for sale.

OBJECTS AND ADVANTAGES

Accordingly, several objects and advantages of my invention are benefits of increasing the pressure above tank pressure to meter NH3 more accurately. Safety is improved with a simpler system with components that exceed safety requirements by a minimum factor of 2. No manifold or line freezing occurs in operation since the NH3 is delivered and placed at a pressure above vapor pressure. Critical seed and fertilizer openers do not freeze and ball up with mud, Germination damage from escaping NH3 is reduced. NH3 can be placed closer to the seed. Improved opener designs can be used. The pressure increasing injection tubes are 3 times smaller and yet durable. The terminal expansion orfices can direct liquid NH3 to a much smaller area in the soil. Dry fertilizer can be more easily placed with the direct injection system. Injection line lengths do not need to be cut to equal lengths. Liquid orthophosphate fertilizer can be placed in the direct proximity of the NH3 terminal expansion orifice without freezing.

The pressure increasing system uses a maximum system pressure of 300 psi. The orifices once installed are seldom changed due to a much broader rate change. This is ideal for variable rate, site specific farming since the system handles a much greater dynamic range based on field speed or band placed rate of NH3.

The placement of NH3 in each band is accomplished with an even uninterrupted flow. This improves crop uptake of nutrients since each band is an even exact lineal band of nitrogen fertilizer. Each plant feeds equally and evenly with a strong competitive effort against weeds. This results in higher crop yields and less loss of nitrogen due to leaching. Nitrogen use efficiency goes up and nitrogen application rates can be reduced about 10%.

The economic impact and utilization of placed phosphate in the band with NH3 is substantially improved. Spring crops can utilize banded phosphate with NH3 more efficiently since phosphate uptake by the plant occurs without the "hot band" effect of irregular and overconcentrated bands of NH3.

The growing crop can more fully utilize all of the placed pressure increasing direct injection NH3. Over application of NH3 is critical to protect the environment. Even exact rates of NH3 improve the environment by decreasing leaching of nitrate. Additives such as N-serve can be more effectively added and mixed to Liquid NH3. This additive further reduces the chance of mobile nitrate leaching through the soil and into the drinking water.

Another critical advantage is the quick response to variable rate site specific, GPS controllers. Since the material is a noncompressible liquid with pressure above vapor pressure and lines have up to 15 times less displacement the applicator is immediately responsive to a rate change. The pressure increasing direct injection system can respond to a lull rate change in less than 3 feet of travel.

The positive displacement pump becomes a flowmeter delivering liquid NH3 to the manifold in metered amounts. Thus the pump can be sensed with an encoder and controlled hydraulically with an electronic comparator circuit. This eliminates coolers, electronic in line NH3 flow meters, and control valves that reduce pressure. The result is a much simpler system with very little maintenance and troubleshooting. The operator can stay in the tractor seat and cover substantially more acres in a day.

The versatile pressure increasing direct injection manifold can be connected to lines and openers without regard to sequence arrangement. Since no vapor is present only non-aberrant liquid NH3 follows the path of least resistance. Applicators with uneven number of openers or a short odd number of openers can utilized one common multiport manifold by blocking off any port outlet. Airseeders can be easily changed from a narrow band spacing to a much wider band spacing by disconnecting the lines and capping off the unused ports. Certain crops require wider NH3 band spacing such as sunflowers while cereal crops such as wheat require narrow NH3 band spacing. The same manifold works for both band spacings with a minimum of lost time in changing band spacing.

The cost savings are significant and NH3 can be placed shallow or deep. Airseeder operators can add the system to compliment to their dry fertilizer system lowering their cost over dry nitrogen sources by $5.00 per acre. They can often double their time between fills. With the onset of cold weather the applicator will continue to apply NH3 at accurate rates even with low tank pressure. This often results in two to three weeks of additional fall banding for corn production. The operators can operate much earlier in the day and extend their application of NH3 into freezing nights if necessary. This new system assures the long-term use of NH3 because it is safer and more economical to use.

Previous inventors and developers found it obvious to work only with pressure decreasing NH3 designs. The pressure increasing system is unique and novel to the industry. It has never been considered as an economic and safe approach to the application of NH3.

Further objects and advantage of my invention will become apparent from a consideration of the drawings and ensuing description.

Figure 1:
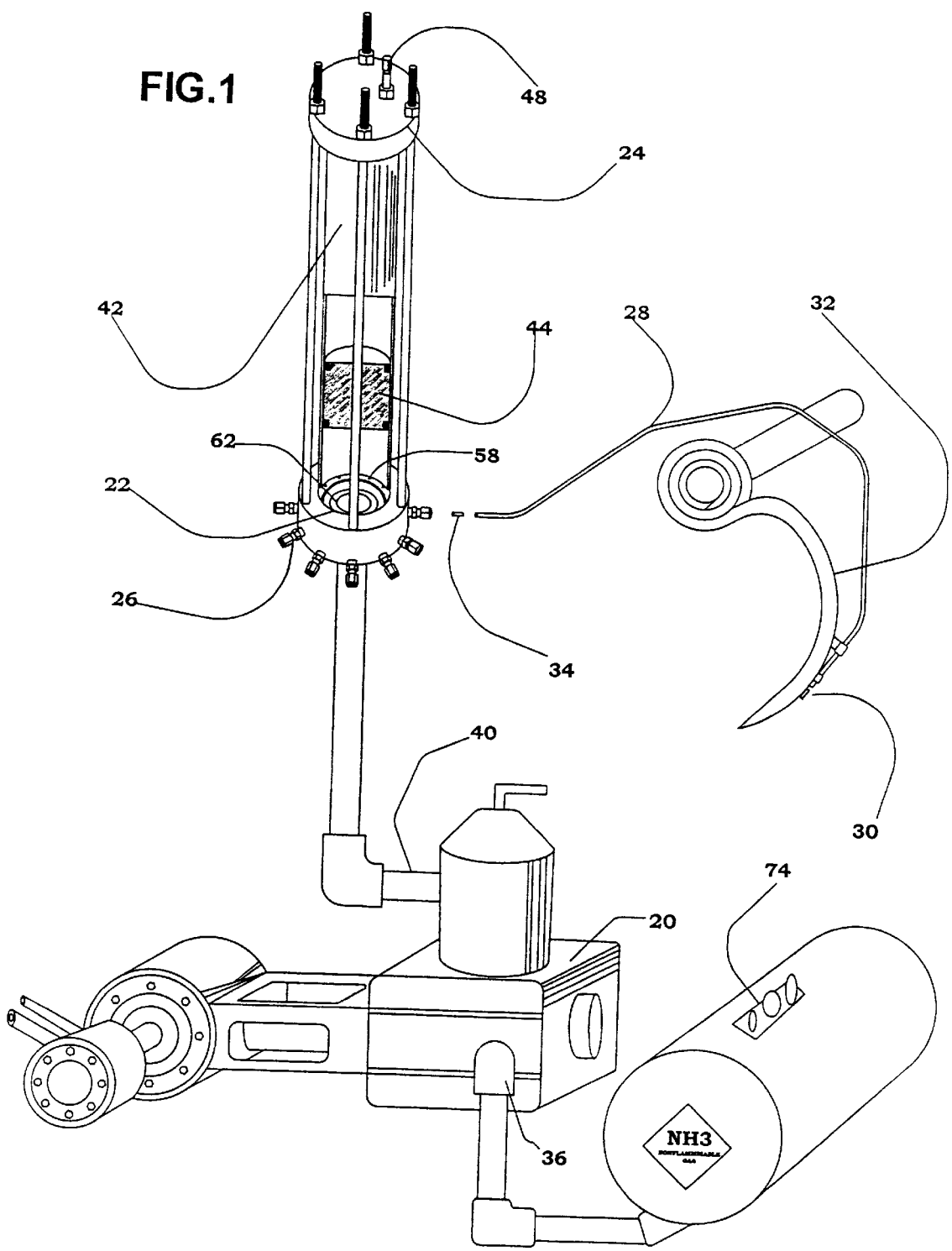
FIG. 1 is a perspective view of my invention which includes a positive displacement pump, a minimum displacement manifold, range orifices, an application tool with minimum displacement injection lines including a terminal expansion orifice.

REFERENCE NUMERALS IN DRAWINGS 20 pump
22 manifold
24 accumulator
26 high-pressure adapters
28 injection lines
30 terminal expansion orifice
32 soil opener
34 range orifices
36 pump inlet port
40 increased pressure outlet port
42 accumulator cylinder
44 accumulator piston
46 accumulator piston seal rings
48 accumulator charging valve
50 terminal expansion steel tube
52 terminal expansion clamp
54 manifold outlet ports
58 manifold internal ports
60 oil
62 manifold inlet
64 liquid NH3
66 nitrogen gas
68 safety shield
70 NH3 liquid stream flow
72 cap plug
74 supply tank or pressure vessel Summary: In accordance with the present invention of a method and an apparatus for delivering and metering accurately nonaberrant NH3 directly into the soil is thereby presented in the form of a pressure increasing pump. a minimum displacement manifold, and terminal expansion orifices.

Description—FIGS. 1 to 4

Figure 2:
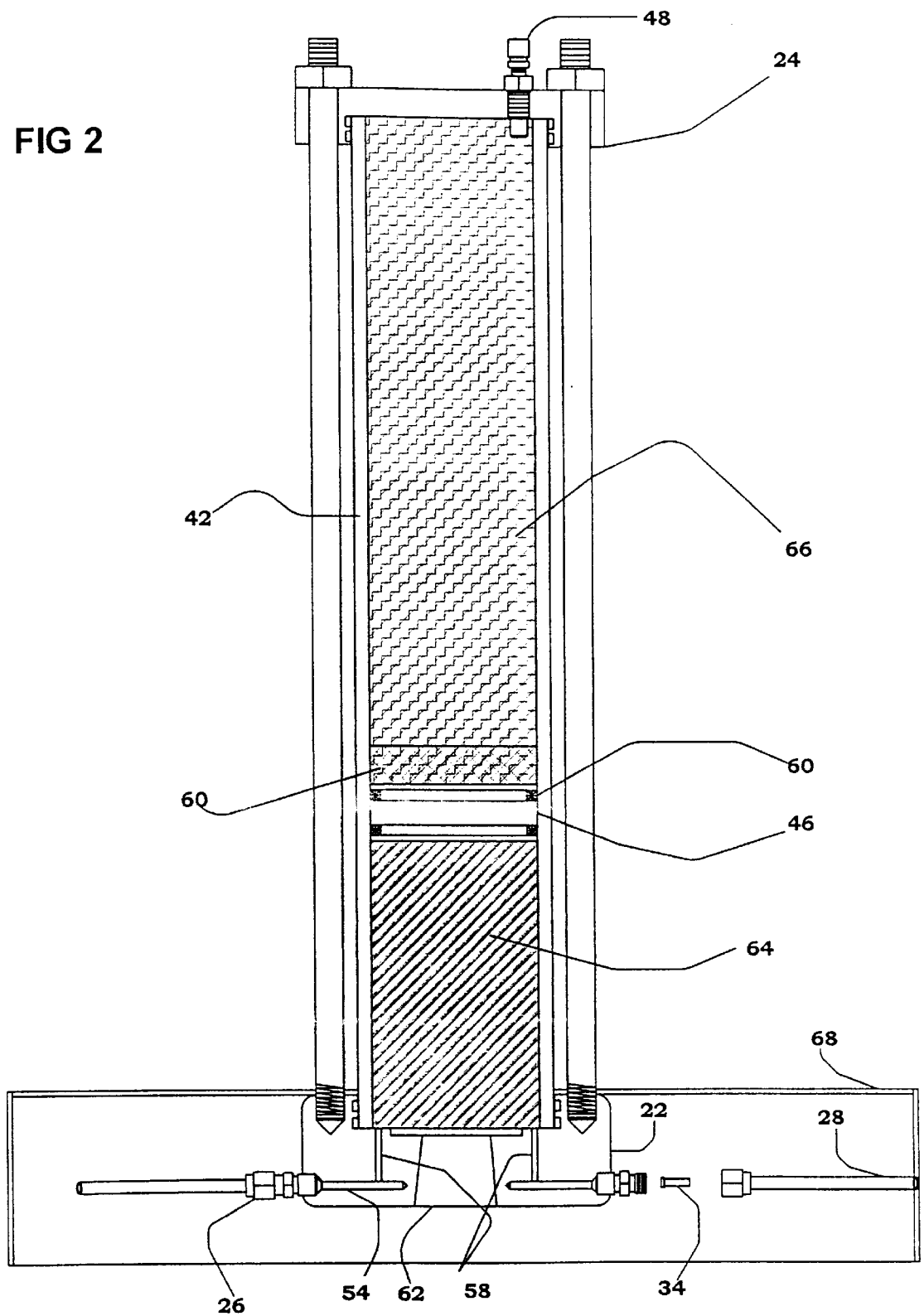
FIG. 2 shows an exploded view of the manifold and range orifice.

A typical embodiment of the system is illustrated in FIG. 1. A pump 20 capable of metering NH3 and raising the pressure above the tank 74 supply side inlet port pressure of the pump inlet port 36 The pump outlet port 40 directs flow above NH3 vapor pressure at normal ground speed to the manifold inlet 62 of the manifold 22. The liquid NH3 FIG. 2 64 enters the manifold 22 and is directed to the manifold internal ports 58. As illustrated in FIG. 2 the manifold outlet ports 54 receive the material from the manifold inlet ports 58. The high-pressure adapters 26 direct the flow to range orifices 34 of greater or smaller diameter of the terminal expansion orifices 30 of FIG. 3. The range orifices of FIG. 2 item 34 act as a support for the injection lines 28. The injection lines 28 are sized as small as possible to provide minimum storage of NH3. Each soil opener 32 is mounted with an injection line 28. The terminal expansion metering orifice 30 can be larger or smaller than the range orifice 34. Liquid NH3 70 is injected into the soil if the terminal expansion orifice 30 is smaller than the range orifice 34.

In certain situations it may be important to meter only with the meter range orifice FIG. 2 34 located at the manifold high pressure adapters 26 and just prior to entry into the injection lines 28. In certain situations it maybe important to meter with the range orifice FIG. 1 34 and the terminal expansion orifice FIG. 1 30 with the same inside diameters. In other situations it may be more important to operate with a larger range orifice FIG. 1 34 and a smaller metering terminal expansion orifice FIG. 4 30 to carry out the final metering and producing a concentrated stream flow on liquid NH3 70.

Figure 3:
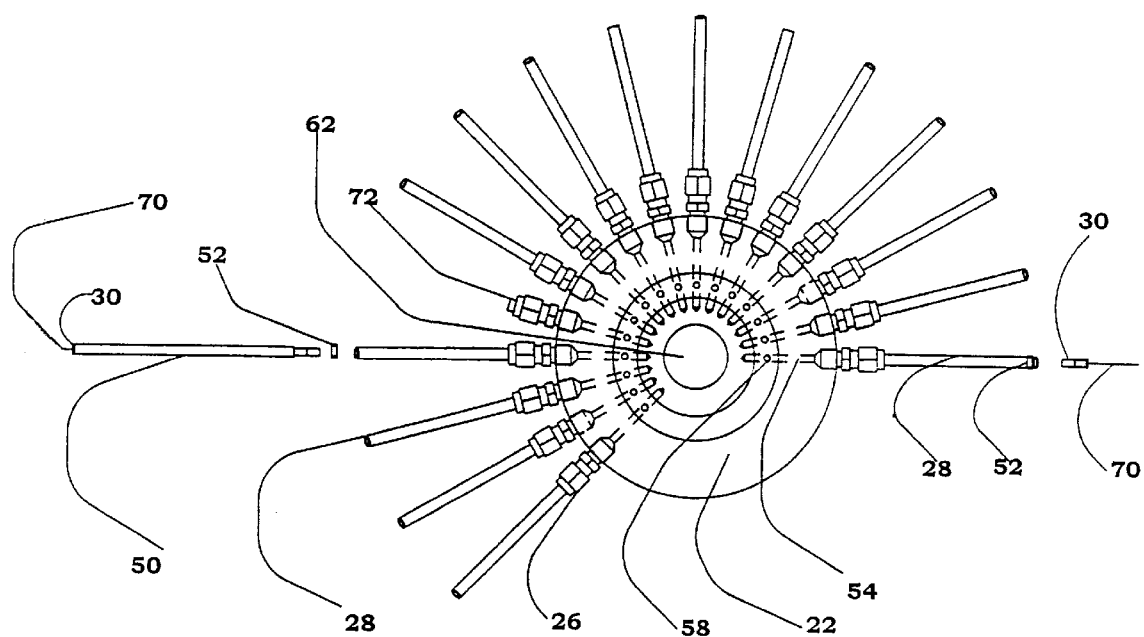
FIG. 3 shows a terminal expansion orifices installed into an injection line.

Accuracy and port to port variance requires at least one orifice FIG. 3 30 or 34 after the manifold 22.It has been observed that the injection lines 28 do not freeze if the terminal expansion orifice 30 is sized slightly larger than the range orifice 34. Thus particulate escapes that plug the range orifice 34 will not plug the terminal expansion orifices 30. It is observed that injection line 28 freezing will occur if the range orifice 34 or the terminal expansion orifice 30 is partially plugged. If the injection line 28 or the terminal expansion orifice is totally plugged the operator will immediately notice that this soil opener 32 is not applying NH3. This is the opposite of pressure reducing systems. Pressure increasing systems of FIG. 1 do not freeze injection lines 28 or manifolds 22 at normal ground speeds. Operators adjust their thinking opposite the pressure reducing system. With the direct injection pressure-increasing system frozen manifolds or lines mean trouble.

Figure 4:
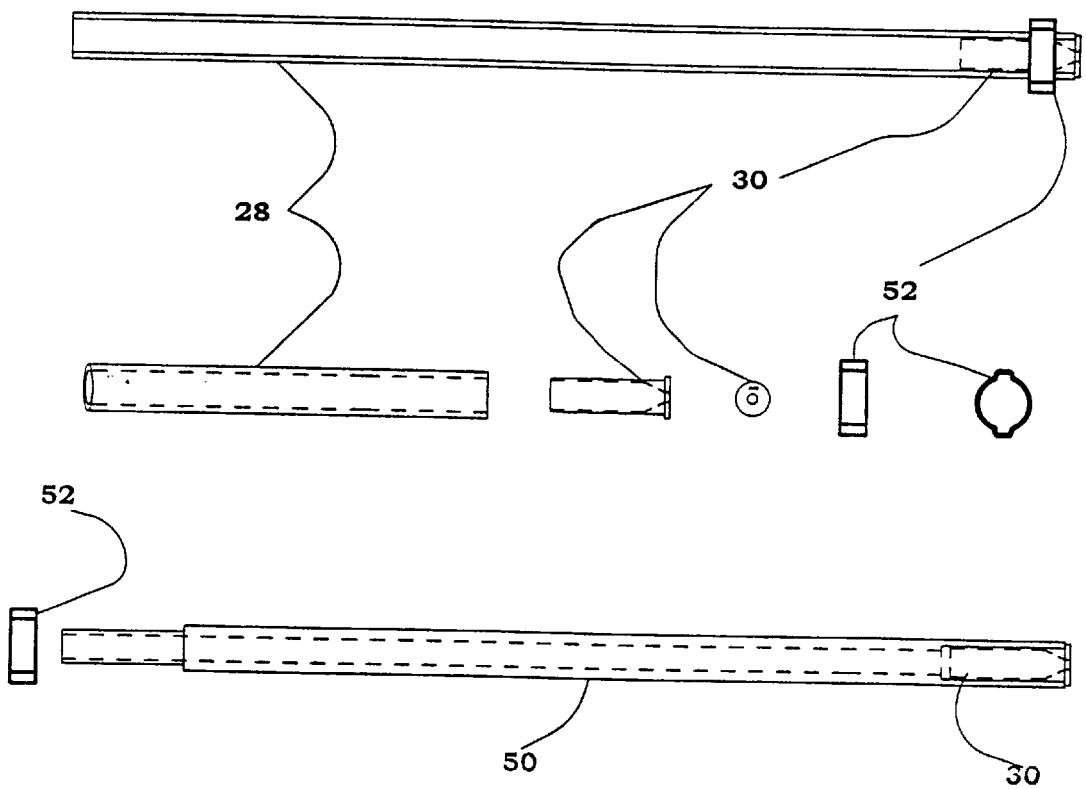
FIG. 4 shows a cross sectional view of a terminal expansion orifice.

A compression clamp FIG. 4 52 is applied around the circumference of the injection line 28 to secure the terminal expansion orifice 30. The compression clamp FIG. 4 52 can also be applied to terminal expansion steel tube FIG. 3 50 to secure the injection line 28 to the tube 50. The terminal expansion steel tube FIG. 4 50 is modified to accept a press fit terminal expansion orifice 30. The terminal expansion steel tube 50 can then be directly mounted and located within very confined spaces of a soil opener 32.

An accumulator 24 is added to the basic system of FIG. 1 and FIG. 2. The accumulator 24 acts to prevent aberrant flow caused by the stroking action of the pump 20. The piston 46 has two o-ring seals that hold back a charge of nitrogen gas 66. The accumulator cylinder walls 42 are lubricated with compatible oil 60 that covers the area just above the piston 46. Nitrogen gas 66 is introduced into the accumulator 24 through a valve 48. The pressure of the nitrogen gas 66 can be adjusted to match the tank pressure. The accumulator 24 is normally charged with nitrogen gas with the accumulator-charging valve 48 at $\frac{2}{3}$ to $\frac{1}{2}$ of tank pressure.

The accumulator 24 closes the internal manifold ports 58 when the pump outlet pressure 40 drops below the preset nitrogen gas charge 66. The accumulator 24 and it's associated piston 44 act to evacuate the system FIG. 1 of liquid NH3 64 when the applicator stops and when the applicator starts it allows an immediate flow of NH3. This improves site specific farming. Very little liquid NH3 64 can be stored as a liquid or a gas within the system at rest. The accumulator 24 helps to prevent a surging flow of NH3 into the soil through the soil opener 32.

The accumulator FIG. 2 24 also has a function of flooding the manifold 22 with liquid NH3 64 when NH3 is in transition from gas to a liquid. This is referred to as transitional flow, which occurs if pressure is slightly below vapor pressure. This can be easily observed by bringing H20 close to the boiling point. As the waterjust begins to boil the lower specific gravity H20 vapor phase gas rises to the surface. Liquid NH3 is heavier than gas phase NH3. The turbulent NH3 gas tends to rise above the manifold inlet ports 58 leaving only liquid NH364 to exit the ports 54 and 58 in the transitional state of NH3.

The system FIG. 1 delivers nonaberrant NH3 to the manifold outlet ports 54. Since the flow of liquid NH364 is not transitional to the vapor phase the high pressure adapters 26 can be plugged off with cap plugs FIG. 3 72. The remaining manifold outlet ports 54, range orifices 34, and or the terminal expansion orifices 30 will meter the liquid NH364 material equally.

A safety shield FIG. 2 64 covers the injection lines 28. The safety shield 64 affords protection from ultraviolet light and possible damage from falling objects. The operator is protected from poor injection line 28 hookups to the high-pressure adapters 26 when the system is started following service and installation. The design and operating pressures meet or exceed the State of Indiana Regulations for safe use of NH3.

I claim:

1. An anhydrous ammonia application method for applying liquid anhydrous ammonia to soil, said method comprising the steps of:
    (a) pressurizing anhydrous ammonia received from a source to a variable pressure level within a conduit;
    (b) conducting the anhydrous ammonia through the conduit to a plurality of terminal outlets, wherein each of the plurality of terminal outlets has a restrictive orifice for maintaining an anhydrous ammonia back-pressure; and
    (c) discharging the anhydrous ammonia from the plurality of terminal outlets, with discharged liquid anhydrous ammonia contacting the soil.

2. A method as claimed in claim 1,
    step (a) including the step of pumping the anhydrous ammonia with a pump,
    wherein the pressure of the anhydrous ammonia conducted between the pump and the plurality of terminal outlets is greater than the vapor pressure of the anhydrous ammonia.

3. A method as claimed in claim 2, wherein the pump is a positive displacement pump.

4. A method as claimed in claim 3, wherein the pump is capable of metering the flow of the anhydrous ammonia and controlling the flow rate of the anhydrous ammonia.

5. A method as claimed in claim 1,
    step (a) including the step of pumping the anhydrous ammonia with a pump,
    wherein the pressure dropped of the anhydrous ammonia conducted between the pump and the plurality of terminal outlets is less than the pressure increase provided by the pump.

6. A method as claimed in claim 1, wherein, in step (b), the anhydrous ammonia is in non-aberrant flow.

7. A method as claimed in claim 1, further comprising the step of, between steps (a) and (b), conducting the anhydrous ammonia to a manifold, said manifold capable of receiving the anhydrous ammonia through a manifold inlet and discharging the anhydrous ammonia through a plurality of manifold outlets.

8. A method as claimed in claim 1, wherein, in step (c), the anhydrous ammonia flowing through the plurality of terminal outlets is non-chilled liquid anhydrous ammonia.

9. A method as claimed in claim 1,
    said pressure level to which the anhydrous ammonia is pressurized depending upon the desired flow rate.

10. An anhydrous ammonia application method for applying liquid anhydrous ammonia to soil, said method comprising the steps of:
    (a) pressurizing anhydrous ammonia received from a source;
    (b) after step (a), conducting the anhydrous ammonia to a manifold, said manifold capable of receiving the anhydrous ammonia through a manifold inlet and discharging the anhydrous ammonia through a plurality of manifold outlets;
    (c) after step (b), conducting the anhydrous ammonia from each of the manifold outlets to a respective one of a plurality of terminal outlets, wherein each of the terminal outlets has a restrictive orifice for maintaining an anhydrous ammonia back-pressure, wherein an accumulator is connected in fluid-flow communication with the manifold and fluidly interposed between the manifold inlet and the plurality of manifold outlets, said accumulator operable to dampen pressure surges in the anhydrous ammonia flowing through the manifold; and
    (d) discharging the anhydrous ammonia from the plurality of terminal outlets, with discharged liquid anhydrous ammonia contacting the soil.

11. An anhydrous ammonia application method for applying liquid anhydrous ammonia to soil, said method comprising the steps of:
    (a) separating an anhydrous ammonia source flow into multiple discharge flows;
    (b) dampening any pressure surges of the anhydrous ammonia source flow;
    (c) maintaining the pressure of the anhydrous ammonia above vapor pressure as the source flow is separated into the discharge flows; and
    (d) discharging each of the discharge flows, with discharged liquid anhydrous ammonia contacting the soil.

12. A method as claimed in claim 11,
    step (a) including the step of conducting the source flow from a pressurized tank of liquid anhydrous ammonia.

13. A method as claimed in claim 12,
    step (a) including the step of passing the anhydrous ammonia through a manifold having an inlet and a plurality of outlets.

14. A method as claimed in claim 13,
    step (b) including the step of dampening any pressure surges in the manifold.

15. A method as claimed in claim 11,
    step (c) including the step of increasing the pressure of the anhydrous ammonia before step (a).

16. A method as claimed in claim 15,
    step (c) including the step of variably pumping the source flow.

17. A method as claimed in claim 15,
    step (c) including the step of restricting each of the discharge flows.

18. A method as claimed in claim 17,
    step (d) including the step of restricting each of the discharge flows as they are discharged.

19. A method as claimed in claim 18,
    step (c) including the step of passing each of the discharge flows through a first restrictive orifice, step (d) including the step of passing each of the discharge flows through a second restrictive orifice.

20. A method as claimed in claim 11, step (c) including the step of restricting each of the discharge flows during step (d).

21. An anhydrous ammonia application method for applying liquid anhydrous ammonia to soil, said method comprising the steps of:

(a) pressurizing an anhydrous ammonia source flow to a variable pressure level;

(b) separating the source flow into multiple discharge flows;

(c) maintaining the pressure level of the anhydrous ammonia above vapor pressure as the source flow is separated into the discharge flows; and (d) discharging each of the discharge flows, with discharged liquid anhydrous ammonia contacting the soil.

22. A method as claimed in claim 21, step (b) including the step of passing the anhydrous ammonia through a manifold having an inlet and a plurality of outlets.

23. A method as claimed in claim 22, step (b) including the step of dampening any pressure surges in the manifold.

24. A method as claimed in claim 21, step (a) including the step of pumping the source flow.

25. A method as claimed in claim 21, step (c) including the step of restricting each of the discharge flows.

26. A method as claimed in claim 25, step (d) including the step of restricting each of the discharge flows as they are discharged.

27. A method as claimed in claim 26, step (c) including the step of passing each of the discharge flows through a first restrictive orifice, step (d) including the step of passing each of the discharge flows through a second restrictive orifice.

28. A method as claimed in claim 21, step (c) including the step of restricting each of the discharge flows during step (d).

29. A method as claimed in claim 21; and (e) maintaining the pressure level of each of the discharge flows above vapor pressure until the discharge flow is discharged.

30. A method as claimed in claim 21, said pressure level to which the anhydrous ammonia is pressurized depending upon the desired flow rate.

31. An anhydrous ammonia application method for applying liquid anhydrous ammonia to soil, said method comprising the steps of:

(a) pressurizing anhydrous ammonia received from a source to a variable pressure level;

(b) conducting the anhydrous ammonia to a plurality of terminal outlets;

(c) maintaining the pressure of the anhydrous ammonia above vapor pressure while the anhydrous ammonia is conducted to the plurality of terminal outlets; and (d) discharging the anhydrous ammonia from the plurality of terminal outlets, with discharged liquid anhydrous ammonia contacting the soil.

32. A method as claimed in claim 31, said pressure level to which the anhydrous ammonia is pressurized depending upon the desired flow rate.

* * * * *